UNITED STATES PATENT OFFICE.

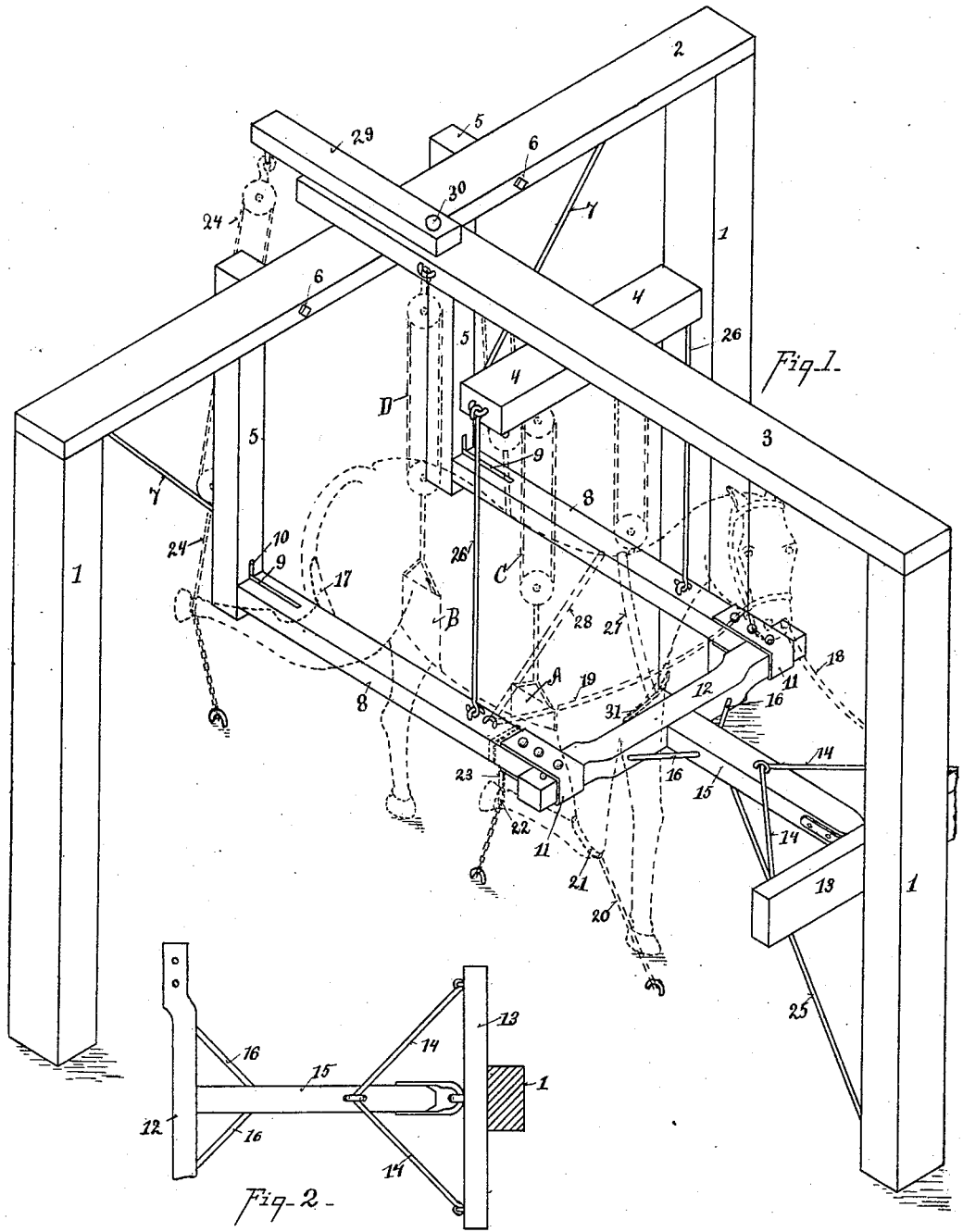

WILLIAM TOMPKINS AND GEORGE SCHNEITER, OF SIDNEY, OHIO.

HORSESHOEING-RACK.

SPECIFICATION forming part of Letters Patent No. 470,958, dated March 15, 1892.

Application filed August 12, 1891. Serial No. 402,469. (No model.)

*To all whom it may concern:*

Be it known that we, WILLIAM TOMPKINS and GEORGE SCHNEITER, citizens of the United States, and residents of Sidney, in the county of Shelby and State of Ohio, have invented certain new and useful Improvements in Horseshoeing-Racks, of which the following is a specification.

The object of our invention is to provide a horse-rack which is substantially so arranged that the devices for elevating the body of the horse and lifting the feet are under ready control of the operator.

Another object of our invention is to have the devices detachable, so that they can be folded up out of the way, all of which will be fully set forth in the description of the accompanying drawings, making a part of this specification, in which—

Figure 1 is a perspective view of our improvement with the rack in position for use. Fig. 2 is a top plan view of the yoke-frame.

1 represents the posts forming the frame, and 2 a beam resting on the top of the two side posts.

3 represents a beam resting on the front post and on the beam 2. This forms a suspension-frame of skeleton form and of sufficient compass to sustain the shoeing-frame and horse and allow easy movements around the horse.

4 represents a cross-beam attached to the beam 3.

5 represents pendent posts, which are pivoted to the beam 2 by bolts 6, so that said pendent posts may turn up laterally out of the way when desired.

7 represents brace-rods, which are detachably connected to posts 5 and are detached when the parts are to be folded.

8 represents the side frames of the rack, these frames having tongues 9 projecting into slots 10 in posts 5. The forward end of each frame 8 is provided with a coupling 11, which engages over the front rack-bar 12. Through said coupling is pierced a hole and the bar 12 is provided with a series of holes laterally. A pin passes through the coupling-piece 11 and through one of the sets of holes in the bar 12, so that the rack containing the horse may be made wider or narrower at pleasure.

The front rack-bar 12 is hinged to the cross-beam 13.

14 represents a brace secured to the coupling 15, which connects the bar 12 with the cross-beam 13, thereby laterally supporting the front end of the shoeing-rack.

16 represents braces connecting the bar 12 and coupling 15. The bars 12 and 15 form a yoke-frame within the front end of the rack.

25 represents a diagonal brace detachably connected to the front posts and coupling 15 for supporting the yoke-frame vertically.

17 represents a breeching-strap fastened behind the horse and hooked to the bars 8.

18 represents a checkrein connected to the bridle and to the front end of the rack to prevent the horse from backing, and 19 represents a strap running from the bridle to the rearward.

20 represents a guy-rope.

21 represents a shackle fastened around the leg of the horse to assist in holding the foot in position.

22 represents a shackle fastened round the foot, secured in position by strap 23 for holding the feet up.

24 represents guy-ropes for supporting the hind feet in rear of the rack-frame. They are secured to a swinging bar 29, pivoted at 30.

26 represents brace-rods for suspending the front end of the frame. They are hinged to the cross-bar 4 and detachably hooked to the side bars 8.

A horse is suspended by means of two bands A B, one passing under the horse behind the front legs and the other in front of the hind legs. These are operated, preferably, by locked tackle-blocks.

28 represents a strap which goes over the withers of the horse to prevent its rearing up.

27 represents a collar, from which a strap 31 is passed between the fore legs and secured to the bands A B to prevent them from being displaced.

The operator, when he desires to shoe a horse, may suspend the front of the horse by means of the locked tackle-block C without elevating the hind portion, or he may suspend the horse's weight entirely within the rack-frame by operating the back tackle-block D. Thus it will be seen that the horse is secured in position in the frame and the weight of the horse may be suspended entirely upon the frame and the feet may be raised at pleasure in an easy and convenient manner, the frame being so constructed and braced that it is very strong and capable of withstanding the thrusts of the animal, which are particularly to be guarded against in the devices of this kind.

The frame as constructed is portable and adapted to be readily taken down and moved from place to place, and when not desired to be used the rack may be taken apart and folded up out of the way, so that the place may be occupied for shop purposes when the rack-frame is not required for use. This is accomplished by unfastening the brace 25 from the coupling-bar 15 and the yoke 12 from the frames 8 and then folding said parts 12 and 15 upward against the front post 1 of the frame, where they may be secured in any suitable manner. The braces 26 are then detached from the cross-beam 4 and the side frames 8 are disconnected from the pendent posts 5, so that the said frames 8 and braces 26 can be stowed away until again needed. By now unfastening the braces 7 the pendent posts 5 can be turned outward on their pivots 6 and be fastened to the side posts 1 by means of any suitable catch. The various straps, tackles, and guy-ropes are also detached and laid aside, and thus the floor-space of the shop is cleared and made ready for other uses until the employment of the shoeing-rack is again required.

The posts 1 and attached beams 2 and 3 may, if desired, constitute a permanent fixture in the shop, as ordinarily they will not interfere with the use of the floor-space.

Having described our invention, what we claim is—

1. In a horseshoeing-rack, the combination of the pivoted pendent posts 5, the detachable brace-rods 7, connected with said posts, the pivoted yoke-frame 12 15, the detachable yoke-frame braces 14 and 25, the side bars 8, having their ends detachably connected with said pendent posts and yoke-frame, and the detachable brace-rods 26 for suspending the side bars, substantially as described.

2. In a horseshoeing-rack, the combination of the posts 1, the cross-beam 2, supported on the two side posts, the longitudinally-arranged beam 3, supported on the front post and on the beam 2, the cross-beam 4, supported by the beam 3, the pendent posts 5, pivoted to the cross-beam 2, the yoke-frame 12 15, pivoted to the front post, the side bars 8, detachably connected to said pendent posts and yoke-frame, the braces 26 for suspending the side bars from the cross-beam 4, and the braces 7, 14, and 25 for the pendent posts and yoke-frame, substantially as described.

3. In a horseshoeing-rack, the combination of the pendent posts 5, the pivoted yoke-frame 12 15, the suspended side bars 8, having their ends detachably connected with the pendent posts, the suspension band or bands, the block-and-tackle connections for said band or bands, and means for supporting the block and tackle, substantially as specified.

In testimony whereof we have hereunto set our hands.

WILLIAM TOMPKINS.
GEORGE SCHNEITER.

Witnesses:
D. W. PAMPEL,
W. H. FEISTOR.